United States Patent [19]

Vedova

[11] 4,365,165
[45] Dec. 21, 1982

[54] LEVEL MEASUREMENT DEVICE

[75] Inventor: Ferruccio D. Vedova, Zugliano, Italy

[73] Assignee: CEDA S.p.A., Udine, Italy

[21] Appl. No.: 105,006

[22] Filed: Dec. 18, 1979

[30] Foreign Application Priority Data

Dec. 20, 1978 [IT] Italy ............................. 83526 A/78

[51] Int. Cl.$^3$ ............................................ G01N 15/06
[52] U.S. Cl. .................................................. 250/577
[58] Field of Search ........................................ 250/577

[56] References Cited

PUBLICATIONS

V. N. Kompan, V. I. Fel'dman, and I. F. Andryukov article entitled Photoelectric Indicator of Melt Level in Glassmaking Furnaces, U.D.C. 666.1.031.228-55, Translated from Steklo i Keramika, No. 9, pp. 21-23, Sep. 1975.

Primary Examiner—David C. Nelms
Assistant Examiner—Darwin R. Hostetter
Attorney, Agent, or Firm—Blanchard, Flynn, Thiel, Boutell & Tanis

[57] ABSTRACT

A level measuring device suitable for measuring the level of any substance, advantageously but not necessarily dangerous substances whether due to heat, toxicity or others, with or without anti-oxidization superficial layers, including in mutual cooperation and coordination an intense light source illuminating a limited and restricted area on the surface of the medium whose level is to be measured, a receiver-perceptor processor so arranged that at least part of the optical control axis is at an angle in relation to the incidence optical axis of said light source, therebeing advantageously present one or more regulating means responsive to the ambient light and to possible infrared rays or the like, regulating means responsive to absorption and reflection features of the light by the material of the surface and the medium in which the rays propagate, alarm means and regulation means.

9 Claims, 5 Drawing Figures fig.1 fig. 2 fig. 3 fig. 4 fig.5

LEVEL MEASUREMENT DEVICE

FIELD OF THE INVENTION

The present invention relates to a level measurement device and, more specifically, to a device suitable for measuring the level of a substance by means of an active reader.

BACKGROUND OF THE INVENTION

The subject matter of the invention finds applications in all those cases where a level measurement must be made from a distance, whether due to toxicity, hazard, high temperature or any other reason.

One typical but not restrictive application is reading the level of molten metal in an ingot mold in continuous casting processes.

In the present example, and when on top of the bath a protective powder is added, the normal known systems react negatively and above all do not ensure the required level reading and measuring accuracy and rapidity.

The present invention indeed attempts to realize a level measurement device having a high quality basic operation which can be further improved by means of suitable modifications and/or additions within the grasp of a person skilled in the art once the basic inventive concept is acquired.

According to the invention, the level measuring device utilizes a light source which projects a light beam on the medium whose level is to be measured.

The light spot is detected by a plurality of sensors (or, according to an alternative embodiment, by a particular sensor of a continuously linear or superficial form) along a line forming an angle with respect to the incident line of the light source.

With reference to a specific application, in itself very complex, which is given by way of example only, the invention will be hereinafter described in its particular construction details.

The specific exemplifying application is an ingot mold in a continuous casting plant.

According to the invention, the light source intensely illuminates a limited area of the surface.

The illumination system is opportunely devised in such a manner that the position of the light spot does not change relative to the surface whose level is to be measured even though the level itself may change.

The light spot is observed continuously and/or periodically by a receiver along a line positioned at an angle with respect to the axis of the mold or with respect to the light source's optical axis of incidence.

The geometrical configuration so realized permits the sensor to detect the variations in the vertical direction of the light spot when the level changes.

It is possible to ensure, by the use of auxiliary means, that the light sensitive element is not influenced by the surrounding light nor by the strong infrared emitted either by the refractory discharge conduit or by the covering powder in the phase of metering and restart.

The circuits used in the level measuring device, according to the invention, are devised in such a way as to execute a continuous or intermittent translation of the level to be measured into an electrical signal.

At the outlet of the measuring device, for instance, a variable voltage can be generated within predetermined limits, such variability being a function of the level, in the specific example, of the molten metal height contained within the control range.

According to the invention, there could also be provided alarm circuits and control circuits as well as other varied mechanisms.

Further according to the invention, the level measuring device is substantially composed by two sections, one section being the generator of continuous or intermittent light source as well as synchronization signals, and the other section being connected to the first section and including an angular position detector which converts the molten metal level into a voltage signal or other signal compatible with the apparatus downstream thereof.

According to a first preferential embodiment the light source generator section may include a variable frequency generator followed by a pulse generating circuit, such pulses being sent to means suitable for emitting the required illumination.

A light detector is connected in the neighbourhood of such illumination means, detects the efficiency of said means and emits a signal which is used as a clock for the processing of the signals.

The absence of said signal can actuate a device which effects the automatic substitution for the illumination means of a similar stand-by illumination means.

The position detector section can be replaced by a plurality of electro-optical or target sensors on which the image of the spot on the surface layer of the steel is projected.

The image of the light spot formed on said surface falls on, according to the height of the metal in the mold, a number of sensors, collimated with the projection angle formed by the path of the rays.

Each sensor is associated with circuits that select the rapidity of response suitable and necessary for the purpose of the invention.

According to the invention, a control system can be provided which controls the sensitivity of the photoelectric sensors (phototransistors).

Such a control system can be advantageously realized by illuminating said sensors by a continuous flood of light of a controlled intensity.

Such a polarized light can be produced by incandescent lamps whose intensity can be controlled with respect to the surrounding diffused light which covers the target in such a way as to maintain the basic polarization light of the photosensors constant.

According to the invention the photosensors output signals which are passed into a special filter and then converted into special signals which can be transmitted by relatively long electric lines to the rest of the circuits.

Such signals can be sent to a number of gates qualified enabled by the synchronizing strobe coming from the flash lamp in such a way as to read the logical level of the signals only in coincidence with the flashes produced by the lamp, thus eliminating unwanted disturbances.

According to the invention, there may also be provided circuits suitable for eliminating interference by impulsive disturbances whose fronts start occasionally in the strobing intervals.

Such circuits can provide a repetitive checking of the signal, since it is highly unlikely that a random disturbance starts two or more successive times during the strobing and is picked up by the same sensor.

According to the invention, after the verification circuits, there can be provided circuits which supply the voltage levels established in the outlet of the channels relative to the sensors and in relation to the intensity of the signal received by the sensors themselves.

These levels actuate a number of corresponding micro-switches, advantageously of solid state design, which supply a variable voltage which is a function of the position of the light spot on the illuminated photoelement.

When a plurality of adjacent sensors are illuminated simultaneously the output circuit can supply a signal proportional to the average voltage level related thereto, supplying thus, at the outlet either the value corresponding to the central photoelement of the group or the average value processed by the system according to the parameters introduced therein.

In the prior art as described by the EPO report No RS 60908 IT dated June 28, 1979, several patents are known which will be described hereinafter.

The U.S. Pat. No. 3,741,656 for Shapiro, describes a level measuring system for measuring the height of a substance in a container which does not provide movable parts nor elements in contact with said substance itself.

A variation in the substance height causes a variation in the detection angle between the light spot projected on the surface of the substance by a light source and an objective lens, which results in a displacement of the image of the light spot in relation to the centre of the lens itself, and a detector measures such displacement.

There are envisaged some light sources which send a light beam perpendicular or inclined with respect to the surface whose level is to be measured and detection systems which make use of the reflected light or that diffused by the surface itself.

The subject matter of the present patent application adopts a measuring system similar to that proposed by Shapiro, but for the detection purposes it uses only the light diffused by the surface.

The original idea is thus improved in order to render the detection independent of the intensity fluctuations of the diffused light and dependent only on the positions of the image of the light spot in relation to the centre of the lens the detection being independent of foreign light sources.

In fact the invention of Shapiro is inadequate and unsuitable for operating in ambients whereby there are disturbing external light sources.

The U.S. Pat. No. 3,867,628 for Brown describes a type of detector suitable only for measuring the variations in intensity of a pulsating frequency light source having a determined duration with a maximum and constant sensitivity in most ambient light conditions.

The detection sensor is kept at an optimal constant level of sensitivity by means of polarization obtained by a current generator regulated by the average level of light incident on the sensor itself.

A double-filtering system eliminates, from the pulsating outlet signal, all frequencies below and above a certain band.

This way the continuous component due to the ambient light is eliminated.

Nonetheless this does not eliminate light pulses emitted by light sources different from those predetermined sources and whose typical frequency is within the above said band (for example neon light, etc.), which may lead to an error in evaluating the intensity of the predetermined light source.

Such a system is uniquely utilizable in measuring the level of a substance in a container whereby the variation of the intensity of the pulsating radiation detected depends exclusively on the level variation.

Measurement systems which use the reflection or the diffusion of the light projected on the surface whose level is to be measured by a light source are useable in conjunction with the above indicated invention only in the case of constantly uniform surfaces and with a constant diffusing coefficient or deflection coefficient and in cases where the surroundings are void of fumes and dust of variable intensity and void of disturbances due to pulsating light.

The invention under consideration, by not basing the level measurement on the intensity variation of the detected light but only on the position of the image of the light spot produced by a pulsating source on the surface to be measured, is suitable for application even in dusty and smoky ambients with surfaces having variable levels with respect to time and space.

Besides, with the help of a feedback system it provides for eliminating all pulses which are not simultaneous with those generated by the light source, and if that proves to be insufficient, a memory and a selection circuit are able to distinguish as legitimate only those signals which are equally repeated during a certain number of successive flashes of the source since it is unlikely that an external signal frequency will coincide with that of the source. Accordingly the subject-matter of the invention is useable even in conditions where there are pulsating external sources of light.

The U.D.C. No. 666.1.031.228-55 for Kompan et al. describes an apparatus for measuring the level of a substance in a container which is based on the measurement of the intensity of light reflected by the surface whose level is to be measured.

A shutter with a rotating window positioned in front of a source of a continuous light generates two pulses of the same frequency but 180° out of phase.

Each of these reflections from the surface strikes half a photo-electric element. In this case no output signal is generated.

When the level changes, the parts of the sensor are no longer equally illuminated and the device generates a suitable signal at the outlet.

Such invention operates on a level measuring principle completely different from that of the present invention, based on reflection and measuring the intensity of the reflected ray.

It can not offer a guarantee of indifference to the optical and mechanical disturbances as offered by the present invention.

The use of moving parts renders that invention even less reliable.

The U.S. Pat. No. 3,838,727 for Levi Shuckarczuk proposes a system of measurement of a molten metal level in a container based on the variation in the intensity of the radiation which strikes a detector when the level itself varies.

The detected radiation is emitted by the substance itself, and the detector "sees" simultaneously, through a window, both a portion of the metal surface and a lateral part of the container. When the level changes the proportions between the metal surface and the container as seen by the detector vary and hence a variation in the intensity of the radiation detected takes place.

This invention does not use a suitable light source and is thus useable only for molten metal baths which are not covered by dust and for smokeless conditions without external disturbances.

The present invention utilizes instead a suitable light source and is also useable in the case mentioned above.

The Pat. No. 745587 for Poncet describes a level measuring device for molten metal in a continuous casting mold, which device makes use of the radiation emitted by the molten metal surface and which is only partially sensitive to disturbances by the jet of metal being poured into the mold itself and the flame.

A lens, whose axis is arranged obliquely in relation to the axis of the mold, produces an optical image of the bath surface; of the pouring jet and part of the lateral surface of the mold.

From such an image, one or more sensors use the most extreme part of the pouring jet and, more specifically, are positioned between the image of the molten metal's surface contour when this is at an optimal level.

Variation in the metal level causes a variation in the illumination of the sensor and consequently a variation in its response.

The sensitivity to the radiation emitted by the pouring jet can be further diminished by increasing the number of sensors and arranging them in a suitable manner.

To avoid disturbances generated by the flames, detectors particularly sensitive to infrared rays are employed.

The subject matter of the present invention does not utilize; for the detection, the radiation emitted by the casting bath, but the radiation produced by a suitable source of pulsating light diffused on the surface of the molten metal.

Besides, for the measurement of the level, it does not exploit the variation of the detected radiation intensity, but only the variation in the position of the small light spot produced on the surface of the liquid by the pulsating light source, which spot is focused by a lens on a suitable sensor.

The device of the present application is therefore by no means sensitive to the radiation emitted by the pouring jet as well as the presence of any flame.

It is also utilizable in smoky surroundings as well as in conditions where there are anti-oxidizing dusts on top of the molten metal.

The present invention therefore consists of a level reader suitable for measuring the level of any substance, advantageously dangerous substances whether due to heat, toxicity or other reasons, and with or without anti-oxidizing superficial layers, characterized by presenting in reciprocal coordination and cooperation:

a source of intense light illuminating a restricted and localised area on the surface of the medium whose level is to be measured;

a processing receiver arranged so that at least part of the optical control axis is at an angle in relation to said light source, there being advantageously included one or more regulation means responsive to the ambient light, regulation means responsive to infrared rays or the light, alarm means and control means.

BRIEF DESCRIPTION OF THE DRAWINGS

Hereinafter a description is given, by way of non-restrictive example, of two preferential embodiments of the invention with reference to the attached drawings in which.

DETAILED DESCRIPTION

In the drawings similar parts or parts with similar functions have similar reference numerals.

Figure 1:
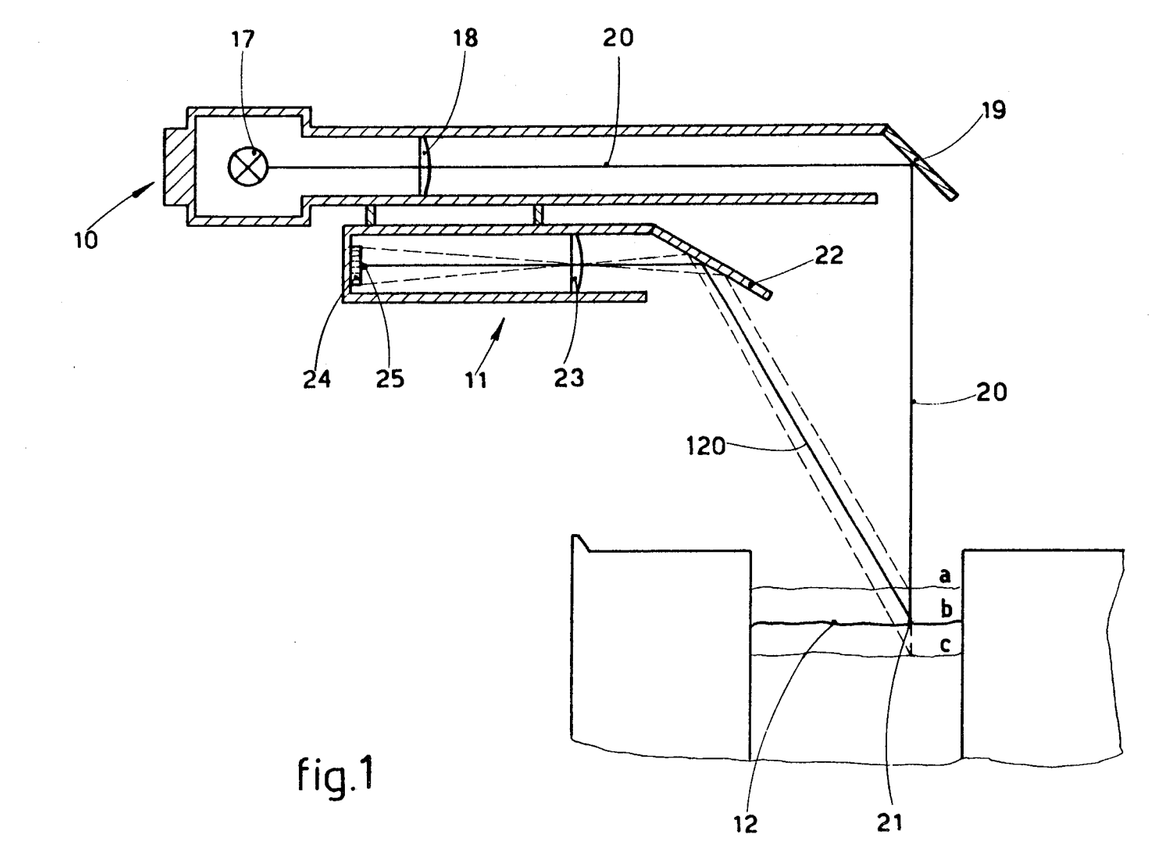
FIG. 1 schematically illustrates one embodiment of the mechanical and optical part of the invention.
Figure 2:
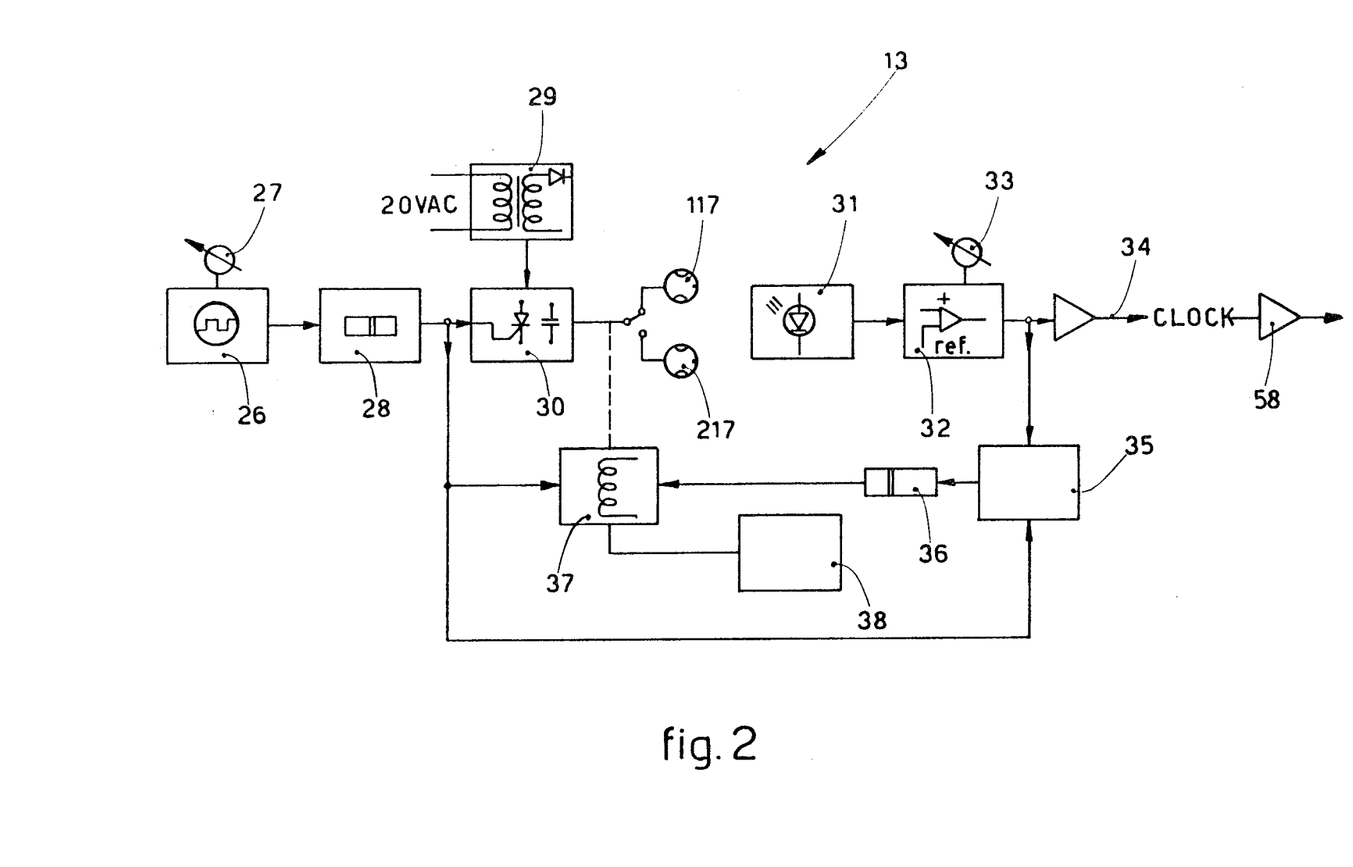
FIG. 2 shows a block diagram of a circuit of a generator of light pulses for a pulsating light embodiment.
Figure 3:
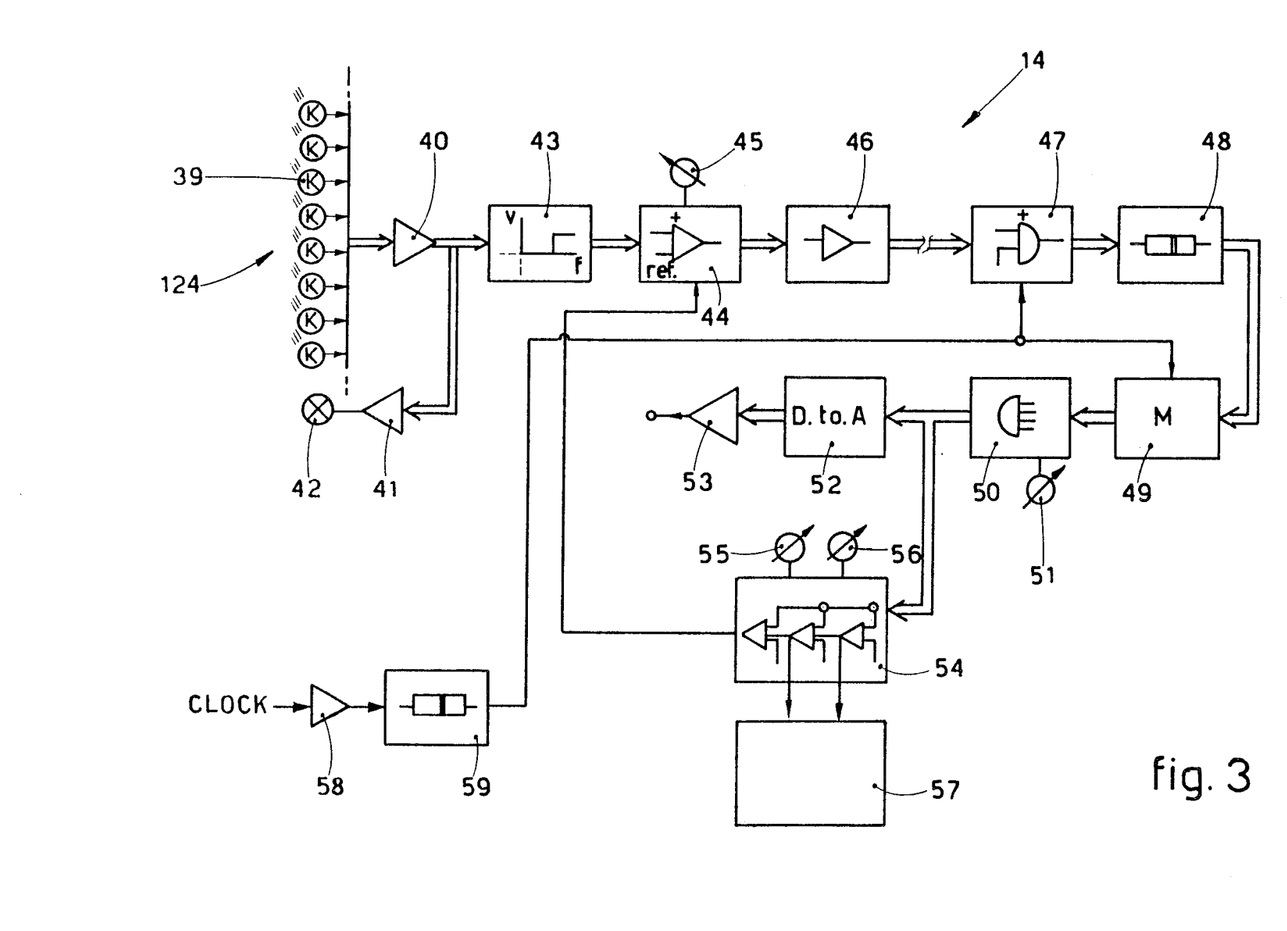
FIG. 3 shows a block diagram circuit of the receiver unit of the pulsating light embodiment.
Figure 4:
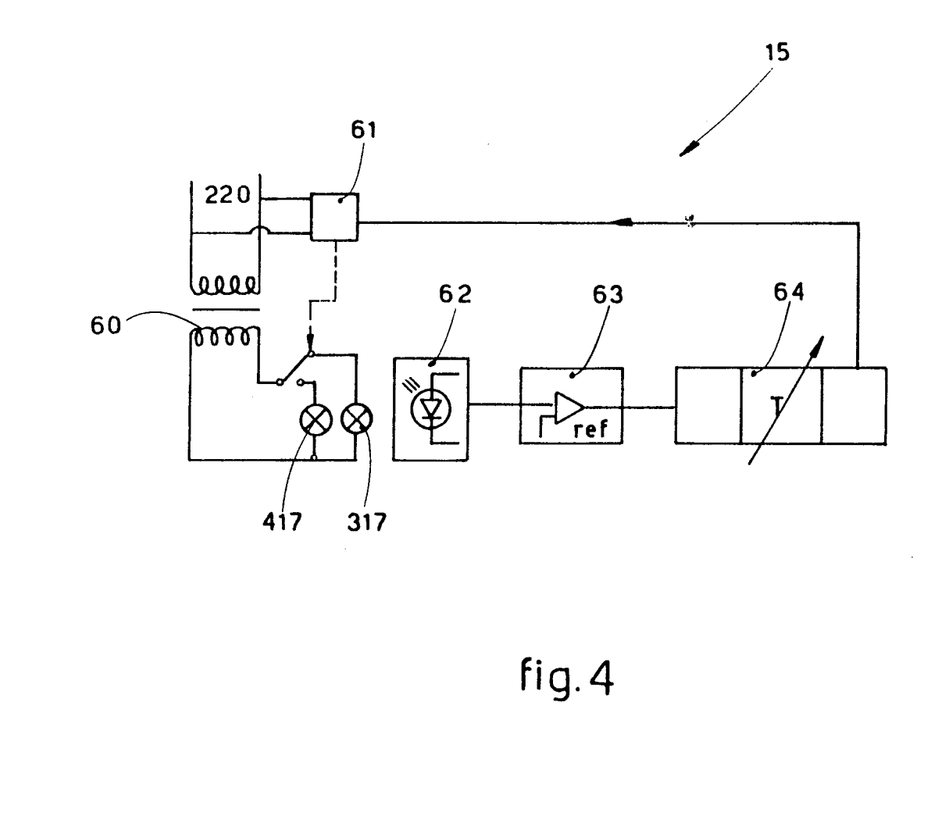
FIG. 4 shows a block diagram of an electric circuit of a light generator for a continuous light embodiment.
Figure 5:
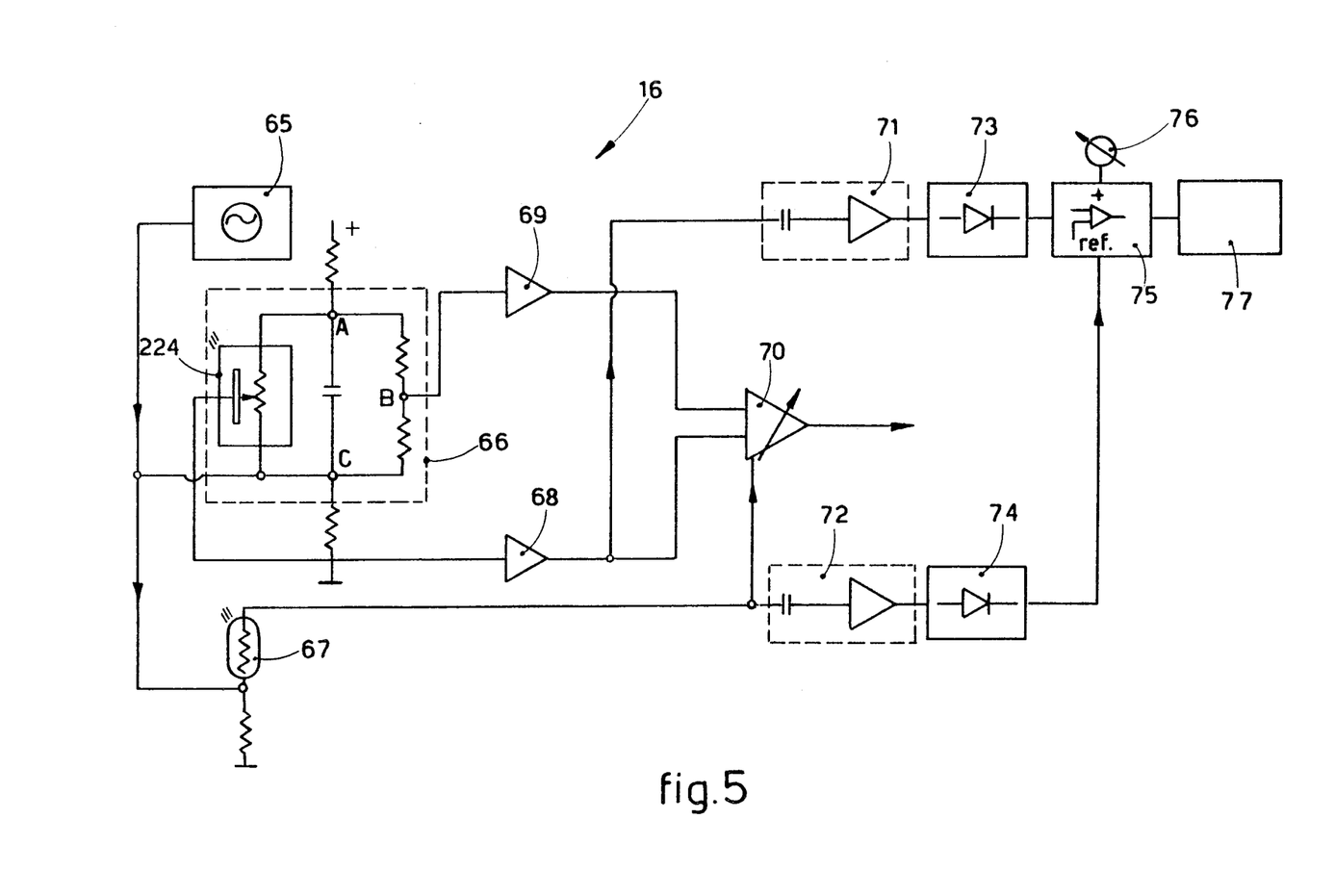
FIG. 5 shows a block diagram of an electric circuit of a receiver unit for the continuous light embodiment.

The optical part 10 of the invention provides for the light and shown at 11 is the optical part of the invention which detects such emission as reflected from a surface 12 whose level is to be read. In FIG. 2, 13 is the light pulse generator unit of the pulsating light embodiment and, in FIG. 3, 14 is the receiver unit for the light pulses. In FIG. 4, is the light generator unit of the continuous light embodiment and, in FIG. 5, 16 is the light receiver of the continuous light embodiment. In FIG. 1, 17 is generically the light source connected to the pulse generator 13, or to generator 15, whereby in FIG. 2 117 and 217 indicate for example two or more stroboscopic lamps of the pulsating light system, and in FIG. 4 317 and 417 indicate, for example, two or more lamps of the continuous light system. Shown in FIG. 1 at 18 is a lens, or a group of lenses, suitable for focusing the light spot 21 on the surface 12 by means of mirror 19; 19 is the mirror, where necessary, which projects the concentrated beam 20 on the surface 12 and 20 is the concentrated beam which is thrown on the surface 12 by the light source 17. Shown at 120 is the axis of optical detection of the light spot 21; 21 is the light spot produced on the surface 12 by the concentrated beam 20 and, where necessary, the reflection mirror for reflecting the light beam 20 arriving from the surface 12; 22 is, where necessary, the reflection mirror for light beam 20 arriving from surface 12; and 23 is a lens, or a group of lenses, suitable for focusing the image of the light spot 21 on the sensitive element 24. In FIG. 1, 24 generically indicates the sensitive element responsive to the light spot 21; in FIG. 3, 124 is the element sensitive to the light spot 12 in the embodiment of the device with light pulses and consists of a plurality of electro-optical or target sensors; and in FIG. 5, 224 is an optical potentiometer sensitive to the light spot 21 in the embodiment of the device with continuous light. In FIG. 1, 25 is the image of the light spot 21 on the sensitive element 24. Referring now to FIG. 2, 26 is a generator of a waveform of electric pulses with adjustable frequency; 27 is the frequency regulator connected to generator 26; 28 is a monostable frequency generator circuit; 29 is the power source for the pulse generator 26; and 30 is the modulator of lamps 117 and 217. Shown at 31 is a photosensor responsive to lamps 217 and 117 when switched on; 32 is an adjustable threshold trigger circuit and 33 is the regulator of the threshold of circuit 32. Shown at 34 is a power amplifier for the pulses generated by circuit 32; 35 is a comparator circuit which checks the simultaneous presence of the pulses originating from circuit 28 and the flash generated by lamp 117 or 217 when switched on; 36 is a delaying block which controls the switching on of one or the other of lamps 117 and 217; and 37 is the electromechanical device which actually effects the switch-over of the lamps 117 and 217. Referring now to FIG. 3, 39 is one of the sensors which form the sensitive element 124; 40 is a group of signal amplifiers (one for each of the sensors); 41 is the amplifier of the average level of light received by the sensors 39 and 42 is a lamp which keeps the average level of illumination of the sensitive element 124 constant. Shown at 43 is a high-pass filter; 44 is a group of adjustable level comparators one for each sensor 39; 45 is the regulator of the minimum level of the threshold of the comparator group 44; and 46 is a group of power amplifiers, one for each sensor 39. Shown at 47 is a line receiver with qualification controlled by the clock signal coming from generator 13 (FIG. 2) and processed by the blocks 58 and 59; 48 is a pulse generator, one for each sensor 39; 49 is a memory in which is stored the logical information coming from the sensors 39; 50 is a circuit for the selection of the information coming from sensors 39; and 51 is a commutator which controls the action of the selection circuit 50. Shown at 52 is a digital to analogue converter; 53 is an amplifier for the analogue signal coming from the converter 52; and 54 is a circuit which outputs an analogue signal proportional to the number of lit sensors 39, which signal controls the threshold of group 44. Shown at 55 is a device which allows the selection of the maximum number of lit sensors 39; 56 is an analogue device similar to 55 for controlling the selection of the minimum number of lit sensors 39; and 57 is an alarm device which goes into action when the number of activated sensors is respectively higher than the maximum number determined by device 55 or lower than the minimum number determined by device 56. Shown at 58 is the receiver of clock pulses arriving from the generator group 13; and 59 is a pulse generator in series with the receiver 58. Referring now to FIG. 4, 60 is a transformer for the power to the generator 15; and 61 is the electromechanical system which provides for the selection of lamp 317 or lamp 417. Shown at 62 is the sensor responsive to the correct functioning of the lamps 317 and 417; 63 is the threshold circuit which processes the signal coming from the sensor 62 and 64 is a timer which controls the switch-over of lamp 317 or 417 at the moment when it is on to the other stand-by lamp 317 or 417. Referring now to FIG. 5, 65 is a generator of an a.c. signal with constant frequency; 66 is a wheatstone bridge; 67 is a photoresistance sensitive to the ambient lighting; 68 is a d.c. separator-amplifier; 69 is a d.c. separator-amplifier; and 70 is an amplifier with a gain adjustable by the ambient illumination through photo-resistance 67. Shown at 71 is a high-pass filter amplifier; 72 is a high-pass filter amplifier; 73 is a peak detector; 74 is a peak detector; 75 is an adjustable threshold circuit; 76 is a manually operable control for the threshold of circuit 75; and 77 is an alarm device for indicating insufficient contrast on the photo-potentiometer 224.

With reference to the attached drawings a description of how the invention in question works is given hereinafter.

The level measurement of the surface 12 (FIG. 1) is executed by projecting thereon a concentrated beam 20 generated by a light source 17, a lens or a system of lenses 18 and a mirror 19.

A light spot 21 is thus projected on the surface 12.

Said spot 21 produces the image 25 on the sensitive element 24 with the help of mirror 22 and lens or lenses 23.

It is important to note that the optical axis 120 of the receiver system of image 25 is disposed at an angle with respect to the projection axis coincident with beam 20.

Such an arrangement causes the variation of the position of image 25 of the light spot 21 on the element 24 in response to sudden changes in the level of surface 12.

The sensitive element 24 is capable of detecting the position and the intensity of the image 25 projected thereon.

To eliminate disturbances, interference or false signals, the sensitive element 24 can be continuously illuminated by the lamp 42 (FIG. 3) or can be continuously compared with the background or ambient intensity measured by photoresistor 67 (FIG. 5).

The light beam 20 (FIG. 1) can be deviated by mirror 19, or could act directly on the surface 12 of the bath.

Similarly, the sensitive element 24 can read the light signal 21 as reflected by mirror 22 or could detect light signal 21 directly.

The light signals, whether in departure or arrival, are piloted and controlled by control circuits; which circuits are respectively a signal generator unit 13 or 15 and a respective receiver unit 14 or 16.

According to the invention, the embodiments illustrated herein by way of example have either a pulsating light source (circuits 13 and 14) or a continuous or constant light source (circuits 15 and 16).

Let us first look into the system with the pulsating light source.

As said before, this device generally comprises two sections. The first section (13 or 15) provides for powering the light source 17 and the second section (14 or 16) transforms the optical information received by the sensitive element 24 to an electrical signal.

Let's see how it works.

The generator 13 (FIG. 2) produces the light flashes through the pulse generator 26, the frequency regulator 27, the monostable impulse emitter circuit 28, the powering device 29 for the pulse generator 29, the modulator 30 for lamps 117 and 217 and lamps 117 and 217.

The trigger circuit 32 is activated by an electric signal coming from the light sensor 31 when this has an adequate intensity, and only during the flashes of lamp 117 or 217.

The signal of the trigger circuit 32 is sent to the comparison circuit 35 which verifies that the pulse generated by the monostable circuit 28 is simultaneous with the flash generated by the lamp 117 or 217.

If the two signals are not emitted at the same time, the comparison circuit 35, after a delay obtained by the delaying block 36, provides for switching on the standby lamp 117 or 217 and activates an alarm with the help of device 38.

The signal from the trigger circuit 32 is also amplified by amplifier 34 and sent as a clock signal to the receiver group 14 (FIG. 3).

Effectively, it is from the generator 13 that a flash is obtained and hence the clock signal that warns the receiver 14 of the presence of a flash to be observed by the sensors 39.

The sensors 39 (FIG. 3) collect the signal arriving from the surface 12 and each outputs an electric signal proportional to the intensity by which it is illuminated.

In particular the sensors 39, on which the image 25 of the flashing spot 21 is formed, output electric pulses contemporary to the flash and of an amplitude proportional to the intensity of spot 21 and hence the image 25.

The electric signals of sensors 39, amplified by amplifying group 40, are sent to a high-pass filter 43 which passes the pulsating signal and blocks signals slowly changing with time, thus eliminating the signals caused by the background illumination.

In order to ensure the constancy of the response speed of each sensor 39, the continuous background illumination of the same is kept constant by means of a lamp 42 by controlling the amplifier 41 driving lamp 42 using the average light level of the sensors 39.

The level comparator group 44 effects a selection based on amplitude, allowing the passage of pulses having an intensity higher than a certain threshold value which is adjustable by the minimum threshold level regulator 45.

If the pulses have an adequate intensity, they pass to the amplifier 46 and are transmitted to line receiver 47.

It allows the passage of only the signals that arrive simultaneously with the clock signals arriving through the pulse receiver 58 and the pulse emitter 59 of generator 13.

This is a safety provision whereby the processing part is enabled to discard illegitimate light emissions.

In this way light pulses not coinciding in time with the flash or lamps 117 or 217 are not taken into consideration.

As a further guarantee of immunity to disturbances, the memory 49, fed by pulse emitter 48, and the selection circuit 50 provides for recognising as legitimate only signals that are repeated equally two, three or four times during successive flashes of produced by generator 13.

This selection criteria is controlled by commutator 51.

A digital to analogue convertor 52 follows, and it outputs a signal correlated with the positions of the activated sensors 39 and thus with the level of the surface 12 to be measured.

If, for instance, the image 25 is detected by three sensors 39, associated thereto, taken singularly, there will be three corresponding electric level signals, whose average is determined by the receiver 14, and based on this average the receiver calculates the position of the spot 21, as a function of the level of surface 12 to be measured.

The sensors 39 which do not receive the image 25 supply a signal correlated with the intensity of the ambient illumination which does not have a sufficient amplitude, after passing through high-pass filter 43, to overcome the trigger threshold of the level comparator group 44.

The receiver 14 then checks, through the circuit 54, that the number of sensors 39 activated falls between predetermined and adjustable limits, and supplies in the contrary case a signal to activate the alarm device 57.

The circuit 54 has a feed-back action which acts on the threshold of the level comparator group 44 in order to automatically adjust the number of sensors 39 activated.

We now proceed to describe the so-called continuous light embodiment.

This embodiment is formed of a light generator group 15 (FIG. 4) and a receiver group 16 (FIG. 5).

The task of the light generator 15 is to supply the optical part 10 of the invention with a continuous light which produces a light spot 21 on the surface which can be easily perceived by the sensitive element 224 and distinguished from other light sources which may create disturbances.

The generator 15 is capable of controlling the correct functioning of lamp 317 by means of sensor 62 automatically providing the switching on of the other lamp 417 in the case of a defect of the first lamp through the threshold circuit 63, the timer 64 and the electromechanical system 61.

The receiver 16 (FIG. 5) of the continuous light embodiment uses the signal produced by the photo-potentiometer 224 as a function of the position of the image 25 and thus the level of surface 12 to be measured and by the photo-resistance 67, a signal correlated to the ambient light intensity.

The receiver group 16 verifies, by means of an a.c. signal supplied by the a.c. signal generator 65, through the photo-potentiometer 224, the photo-resistance 67, the amplifier-separator 68, the high pass filters 71 and 72, the peak detectors 73 and 74 and the adjustable threshold circuit 75 that on the photo-potentiometer 224 there is a sufficient contrast between the image 25 and the diffused ambient light.

The output signal of the adjustable threshold circuit 75 actuates, in case of insufficient contrast, an alarm device 77 which signals the low reliability of the indication supplied by the adjustable gain amplifier 70.

An automatic control of the gain of amplifier 70 compensates within certain limits for the decrease of sensitivity of the photo-pontentiometer 224 due to the fading contrast between the generally constant intensity of the image 25 and the variable intensity of the ambient light.

By means of this control the interdependence between the level of surface 12 and the output signal of the adjustable gain amplifier 70 is rendered independent of the variation of the sensitivity of photo-potentiometer 224.

The control is achieved by the photo-resistance 67 which adjusts the gain of amplifier 70 in proportion to the intensity of the perceived ambient light.

Two possible embodiments of the invention have been described, but other variants are possible. It is thus possible to vary the dimensions and ratios; it is possible to add to the optical system some optical interference filters; it is possible to vary the spectra of the light source and the receiver and it is possible to work with a selected intensity and frequency modulated light source by synchronizing the receiver with the light source. It is possible to use a continuous monochromatic source coupled to a receiver provided with an optical interference filter; and it is possible to use a modulated monochromatic light and synchronized reception with an optical interference filter.

These and other variants are possible for a person skilled in the art without going beyond the ambit of the concept of the invention.

The embodiments of the invention in which an exclusive property or privilege is claimed are defined as follows:

1. A device for measuring the level of a surface, comprising:
   a light generator spaced from said surface and including a light source for projecting a concentrated beam of light onto said surface along a first line, said beam of light illuminating a limited area of said surface; and
   a light receiver spaced from said surface and including light sensitive means and means for focusing onto said light sensitive means the light diffused from said limited area of said surface along a second line arranged at an angle to said first line so as to produce an image of said limited area, said position of said image on said light sensitive means varying with changes in the level of said surface and said light sensitive means being responsive to the position of said image thereon, and including first means responsive to said light sensitive means for producing an output signal which indicates the position of said image on said light sensitive means.

2. The level measuring device of claim 1, wherein said light generator includes means for actuating said light source in a rapid and periodic manner and means for producing a train of pulses which are synchronized with said periodic actuation of said light source.

3. The level measuring device of claim 2, wherein said light sensitive means includes a plurality of light sensitive elements which each produce an electrical signal in reponse to the presence of light, said image of said lighted area of said surface falling on different said light sensitive elements as said position of said image on said light sensitive means varies, and wherein said first means includes:

filter means responsive to said light sensitive elements for propagating only signals therefrom which have a frequency greater than a predetermined frequency which is less than the frequency of said synchronizing pulses;

level comparator means responsive to said filter means for propagating only signals therefrom which have an amplitude greater than a threshold;

line receiver means responsive to said level comparator means and to said synchronizing pulses from said light generator for propagating only signals coincident in time with said synchronizing pulses; and second means responsive to said line receiver means for determining which of said light sensitive elements generated a signal received from said line receiver means and for producing said output signal on the basis of such determination, thereby indicating the position of said image on said light sensitive means.

4. The level measuring device of claim 3, wherein said second means is responsive only to signals which occur at least twice and in coincidence with successive said synchronizing pulses.

5. The level measuring device of claim 3, wherein said second means includes means responsive to the number of signals simultaneously generated by respective said light sensitive elements and simultaneously received from said line receiver means for automatically adjusting said threshold of said level comparator means so as to substantially maintain said number of signals within a range bounded by preselected maximum and minimum limits, and includes alarm means for providing an indication when said number of signals is outside said range.

6. The level measuring device of claim 2, including a source of illumination adjacent said light sensitive means and means responsive to said light sensitive means for controlling the intensity of said illumination source so as to maintain a substantially constant level of ambient illumination on said light sensitive means.

7. The level measuring device of claim 1, wherein: said concentrated beam of light is produced substantially continuously, said light sensitive means produces an electrical signal which varies as a function of the position of said image on said light sensitive means, and said first means includes a light sensitive element positioned in the vicinity of said light sensitive means and responsive to the intensity of ambient light, and includes a variable gain amplifier responsive to said light sensitive means for producing said output signal, said variable gain of said amplifier being controlled by said light sensitive element.

8. The level measuring device of claim 7, wherein said first means includes means responsive to said light sensitive means and to said light sensitive element for comparing the intensity of said image to the intensity of the ambient light, and includes alarm means for producing an indication when the contrast between said intensities of said image and said ambient light falls below a predetermined value.

9. The level measuring device of claim 1, wherein said light generator includes a further said light source, selector means cooperable with said first-mentioned and further light sources for effecting operation of a selected one thereof by said light generator, means responsive to said selected light source for causing said selector means to select the other said light source when a failure of said selected light source is detected, and alarm means for indicating a failure of said selected light source has been detected.

* * * * *